United States Patent [19]
Matsumoto et al.

[11] Patent Number: 5,802,443
[45] Date of Patent: Sep. 1, 1998

[54] REINFORCED THIN CYLINDRICAL STRUCTURE, IMAGE FIXING DEVICE USING THIS CYLINDRICAL STRUCTURE, AND METHOD FOR MANUFACTURING REINFORCED THIN CYLINDRICAL STRUCTURE

[75] Inventors: Mitsuhiro Matsumoto; Yasuhiro Uehara, both of Nakai-machi; Yoshio Shoji, Minami-ashigara, all of Japan

[73] Assignee: Fuji Xerox Co., Ltd., Tokyo, Japan

[21] Appl. No.: 747,210

[22] Filed: Nov. 12, 1996

[30]   Foreign Application Priority Data

Feb. 8, 1996   [JP]   Japan ................... 8-045673

[51] Int. Cl.$^6$ ........................... G03G 15/20
[52] U.S. Cl. .............. 399/333; 29/515; 29/525; 29/895.2; 492/46; 492/47
[58] Field of Search ................... 399/330, 333; 219/216, 469; 29/895.21, 895.2, 895.3, 515, 525; 492/21, 27, 39, 45–47

[56]   References Cited

U.S. PATENT DOCUMENTS

| 1,984,115 | 12/1934 | Cooper | 29/516 |
|---|---|---|---|
| 2,263,439 | 11/1941 | Hansen | 34/240 |
| 3,430,321 | 3/1969 | Lyons | 492/45 |
| 3,853,214 | 12/1974 | Vinarcsik et al. | 492/15 X |
| 4,127,764 | 11/1978 | Minden | 219/216 |
| 4,348,579 | 9/1982 | Namba | 219/216 |
| 4,544,435 | 10/1985 | Hawerkamp | 156/428 |
| 4,974,782 | 12/1990 | Nelson | 241/227 |
| 5,257,965 | 11/1993 | Fuchs et al. | 492/47 X |
| 5,357,321 | 10/1994 | Stenzel et al. | 399/167 |
| 5,522,785 | 6/1996 | Kedl et al. | 492/21 |
| 5,599,265 | 2/1997 | Foltz | 492/47 |

FOREIGN PATENT DOCUMENTS

| U-56-7949 | 6/1979 | Japan . |
|---|---|---|
| A-57-155571 | 9/1982 | Japan . |
| U-59-128665 | 8/1984 | Japan . |
| Y-2-61-4926 | 2/1986 | Japan . |
| A-61-59381 | 3/1986 | Japan . |
| A-63-267952 | 11/1988 | Japan . |
| A-1-126417 | 5/1989 | Japan . |
| A-6-130845 | 5/1994 | Japan . |

*Primary Examiner*—Matthew S. Smith
*Attorney, Agent, or Firm*—Oliff & Berridge, PLC

[57]   ABSTRACT

A small-sized high performance fixing device is realized by using a thin cylindrical structure having a structure which prevents loss of contact between inner reinforcing members and the thin cylindrical structure and prevents collapsing in the circumferential direction of the thin cylindrical structure due to wall-thinning, when the thin cylindrical structure receives the external force on the peripheral surface thereof.

For a fixing device for heat fixing operated by passing recording papers, on which toner images were transferred, through a pressurizing zone formed by a fixing roller formed of a cylindrical structure having a heater in the inside and a pressure roller, a cylindrical structure which is provided with at least one supporting member forcibly inserted in the thin cylindrical structure and is maintained in the firm contact condition with the inside surface of the cylindrical structure at portions of the outside peripheral surface of the supporting members, is used as the fixing roller.

17 Claims, 21 Drawing Sheets

Fig. 23
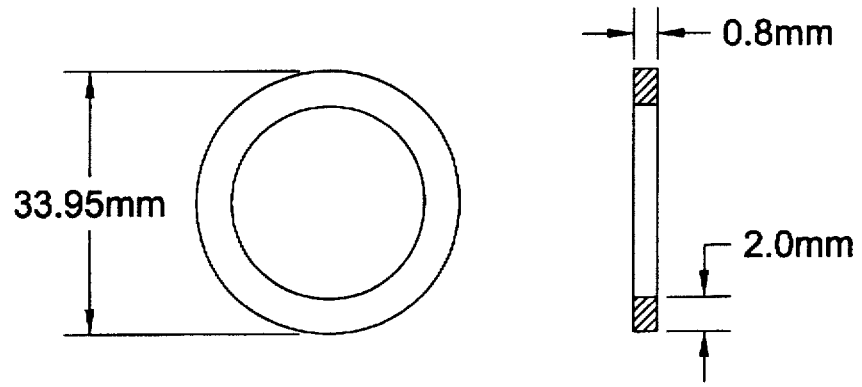
Fig. 23(A)  Fig. 23(B)
Fig. 24
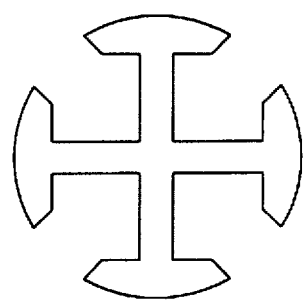

REINFORCED THIN CYLINDRICAL STRUCTURE, IMAGE FIXING DEVICE USING THIS CYLINDRICAL STRUCTURE, AND METHOD FOR MANUFACTURING REINFORCED THIN CYLINDRICAL STRUCTURE

BACKGROUND OF THE INVENTION

1. Field of the Invention

This invention relates to a fixing device using a reinforced thin cylinder structure, a thin cylinder structure used for the fixing device, and a method for manufacturing thereof.

2. Description of the Related Art

Copy machines utilizing an electrophotographic process require a process for fixing the toner formed on a recording sheet to convert it to a permanent image, various fixing method such as the solvent fixing, pressure fixing, and heat fixing have been known as the fixing method.

The solvent fixing is disadvantageous in that solvent vapor is transpired to cause odor and health problems, and the pressure fixing is disadvantageous in that the flexibility is poor in comparison with other methods and pressure sensitive toner to be used in this method is expensive. Therefore, these two methods have been not used practically.

Accordingly, as a fixing method of a toner image for copy machines utilizing an electrophotographic process, the heat fixing in which toner is melted by heating to fix the image on a recording sheet has been used popularly.

FIG. 1 is a diagram for illustrating the schematic structure of a fixing device utilizing the heat fixing. As shown in FIG. 1, the fixing device comprises a heating roller 30 provided with a heater 31 in a cylindrical metal core 32 and a releasing layer 33 comprising a heat resistant resin coating layer or heat resistant rubber coating layer formed on the outside peripheral surface of the metal core 32, and a pressure roller 40 provided in contact with the heating roller with the pressure roller comprising a cylindrical metal core 41 and a heat resistant elastomer layer 42 formed on the outside peripheral surface of the metal core. The fixing processing is carried out by passing a sheet 43 on which a toner image 44 is formed between the heating roller 30 and pressure roller 40, then, additives contained in the toner are fused so that the image is fixed on the sheet 43.

The heating roller method in which a heating roller is used to fix as a fixing device utilizing heat fixing is advantageous in that the thermal efficiency is high in comparison with other heat fixing methods such as hot air fixing and oven fixing, therefore required electric power is low (energy saving) and copying speed is high, and also the risk of fire due to paper jamming is low, therefore the heating roller method has been used popularly.

Conventional heating roller type fixing devices require a long time for raising up the surface temperature of the heating roller from a room temperature to a prescribed setting temperature (referred to as warm-up time hereinafter), namely 1 minute to 10 minutes. The warm-up time is determined based on the relationship between the heat capacity of the heating roller and supplied power. Therefore if the heat capacity of the heating roller is small and supplied power is large, the warm-up time can be shortened. However, the reduction of the heat capacity of the roller is limited by the rigidity of the roller, and the increase of supplied power is also limited by the power consumption of the copy machine.

In general, power to be exclusively supplied to a fixing device ranges from 300 W to 1000 W. In order to shorten the warm-up time within this power range, it is most effective to reduce the heat capacity of the heating roller.

If the diameter of a roll and wall thickness of a roll core are reduced to decrease the roll heat capacity of a roller to be used for a fixing device, the roll rigidity is reduced with the reduction of the diameter or wall thickness. The roll heat capacity is proportional to the square of roll diameter, while the roll rigidity is proportional to the biquadrate of roll diameter. When a load which is necessary for the fixing roller to function sufficiently is applied on the fixing roller having a small diameter, the load causes deformation in the axial direction of the roller (referred to as deflection hereinafter) and deformation in the peripheral direction (referred to as collapse hereinafter). As described above, the reduction of the roll diameter beyond a certain value results suddenly in the reduction of roll rigidity, thus a load sufficient for fixing can not be loaded.

Particularly, collapsing of a roller out of the above-mentioned two types of deformation severely affects on the function of the fixing device, namely the function of the heat fixing process. In detail, the function for carrying papers by pinching and the function for uniform heat transferring to toner layer are not quite performed, thus the fixing device does not function as a fixing device. Therefore, the wall thickness should be more than a prescribed value which is sufficient for a prescribed roll rigidity.

In general, pressure of 0.5 to 5.0 kg/cm$^2$ in nipping area of a pair of rollers comprising a heating roller and pressure roller is necessary for performing prescribed fixing function. Interstices due to the roughness on the surface of a paper and roller can not be eliminated by a pressure lower than the prescribed value, heat is not transferred efficiently to powder toner. Such heat transfer causes mottled fixed toner surface, namely poor image quality.

Since the total load between both rollers is as high as 20 to 200 kg for loading sufficient pressure necessary for fixing, the roll rigidity of a heating roller which is resistant to such heavy load is necessary for a roller used as a heating roller (cylinder), and the minimization of roll diameter and the thinning of roll wall are inherently restricted.

In view of such problems, various techniques for preventing collapse of thin rollers have been proposed. These techniques for preventing collapse of rollers and problems which occur when such rollers are used for a fixing device are described hereinunder.

As the first method, for example, Japanese Unexamined Utility Model Application No. 59-128665, Japanese Examined Utility Model Application No. 61-4926, Japanese Unexamined Patent Application No. 61-59381, and Japanese Unexamined Patent Application No. 6-130845 describe a method in which a reinforcing member is provided in a roller to prevent collapsing, thus the roll strength is increased without increasing in heat capacity of the roll itself. FIG. 2 is a cross-sectional view for illustrating the first example of a conventional fixing roller structure. In FIG. 2, the numeral 1 represents an inner frame of a supporting member of a roller, the numeral 2 represents a supporting rod for supporting the inner frame, the numeral 3 represents a roller (sleeve), the numeral 4 represents thermal insulator, the numeral 5 represents a coil heater, namely a heating source, the numeral 6 represents an offset preventing layer, namely a releasing layer, and the numeral 7 represents a supporting shaft.

For such a fixing roller having a structure as shown in FIG. 2, the supporting rod 2 for supporting the inner frame 1 of the reinforcing member for the roller 3 which is a constituent of a fixing roller is required, that is, large members for inner reinforcing structure are required. Such structure results inevitably in the large size and increased cost. In addition, the placing of large members in a fixing roller results in increased heat capacity of the whole fixing roller, so such structure is not preferable from the view point of the reduction of warm-up time. The portion of contact between the inner frame 1 and roller 3 should be structured using thermal insulator 4 such as resin. If a material having a thermal expansion coefficient smaller than that of metals is used, the inner frame 1 can lose contact with the inner surface of roller 3 when the fixing roller is heated, which is an disadvantage.

FIG. 3 is a cross-sectional view for illustrating the second example of a conventional fixing roller structure. As shown in FIG. 3 depicting the second method, a roller 8 is provided with thick portions 9 each having the wall being formed partially thick in the axial direction. As a modified example of this case, a structure in which ribs for reinforcement are provided instead of thick portion 9 each having the wall being formed partially thick in the axial direction proposed. Examples of the second method is described in, for example, Japanese Unexamined Utility Model Application No. 56-7949 and Japanese Unexamined Patent Application No. 57-155571.

For manufacturing a fixing roller having a structure according to the second method, the wall should be so processed that the wall thickness of a roller 8 varies partially in the axial direction to form thick portions 9 inside the cylindrical structure. Therefore the heat capacity varies along the axial direction partially at the thick portions. If this type of heating roller is used for heat fixing, and the roller is heated, the thick portions cause ununiform temperature distribution, thus the uniform fixing inadvantageously failed. Further, in manufacturing of rollers, the drawing method can not be used for manufacturing seamless pipes, the manufacturing process of such roller results in higher cost.

FIG. 4 is a cross-sectional view for illustrating the third example of a conventional fixing roller structure.

As shown in FIG. 4 depicting the third method, a solid pipe is inserted into the internal of a cylinder to improve the rigidity of a thin cylinder as described in Japanese Unexamined Patent Application No. 63-26752. In the case of the roller shown in FIG. 4, reinforcing rigid members 11 are inserted to a conductive cylinder member 10, which is served as a photosensitive member, from both ends to improve the rigidity of the conductive cylindrical member 10. In this case, the contact charging conductive rubber roller 12 functions as a pressure roller.

In the third method, the roller essentially has high rigidity. However, because the reinforcing rigid member 11 is a solid member, a heat generating mechanism can not be provided when the roller is used as a fixing roller. This type of fixing roller can not be used for heating roller type fixing devices. Further, even when such roller is used for fixing devices of surface heat generating type (roller pair type) having no heat generating mechanism in the internal of the roll, such type of roller is not preferable from the view point of low power performance (energy saving) because of the surface temperature rising loss due to transfer of heat to the internal. The weight due to the reinforcing rigid member 11 is added, the roller has the same roll rigidity as that of a roller designed to have a thick wall, and such requirement for the extra member results in cost up. The reinforcing rigid member 11 is a member having large heat capacity, it means that a member having a large heat capacity is provided in the internal of the roller, such high heat capacity structure is not preferable also from the view point of shortening of warm-up time.

FIG. 5 is a cross-sectional view for illustrating the fourth example of a conventional fixing roller structure. In a thin cylindrical structure according to the fourth method, an inner core formed of thin plate is inscribed inside a thin cylindrical outer cylinder and fixed as described in Japanese Unexamined Patent Application No. 1-126417. In detail, as shown in the cross-sectional view of FIG. 5, the roller has a structure that the inner core 14 in the form of a triangular prism formed of thin plate is inscribed inside the cylindrical outer cylinder 13 and fixed. In the case of the structure in accordance with the fourth method, it is difficult to provide a infrared ray lamp heater in the internal as a heating source. From the viewpoint of the strengthening of a roller, the rigidity in the direction of the axis of the roller is improved, but collapsing due to the thinning of the wall in the peripheral direction is not prevented at the area where the inner core 14 is inscribed, therefore such structure is not preferable from the view point of reliability.

The present invention is accomplished in view of the above-mentioned various problems, it is an object of the present invention to provide a small-sized high performance fixing device using a thin cylindrical structure, which thin cylindrical structure receives the external force at the peripheral surface, having a structure which is free from the problem of loss of contact between the inner reinforcing member and the thin cylindrical structure and prevents sufficiently the thin cylinder from being collapsed due to the thinned wall in the peripheral direction. Further, it is another object of the present invention to provides a thin cylindrical structure used for fixing devices and a method for manufacturing the thin cylindrical structure.

SUMMARY OF THE INVENTION

To achieve the above-mentioned objects, it is the first aspect of the heating roller type fixing device of the present invention that the fixing device is provided with a thin cylindrical structure having a structure which prevents loss of contact between inner reinforcing members and the thin cylindrical structure and prevents collapsing in the circumferential direction of the thin cylindrical structure due to wall-thinning, when the thin cylindrical structure receives the external force on the peripheral surface thereof.

It is the second aspect of the cylindrical structure which receives the external force on the peripheral surface in accordance with the present invention that, when at least two or more of supporting members are provided in the thin cylindrical structure, the conditions described herein under are satisfied, $$L > 200 \text{ mm}, \ t/D < 0.02, \text{ and } P < 150 \text{ mm}$$

wherein P represents the interval between the supporting members, L represents the length of the cylindrical structure, D represents the outside diameter of the cylindrical structure, and t represents the wall thickness of the cylindrical structure.

It is the fourth aspect of the thin cylindrical structure that the supporting member is ring-shaped, and it is the fifth aspect that the supporting member has a notch or projection on the cross-sectional shape of the outside peripheral surface in the axial direction at least on a portion. It is the sixth aspect that the supporting member has a notch or projection on the cross-sectional shape of the outside peripheral surface in the circumferential direction at least on a portion.

It is the third aspect, in a method for manufacturing a cylindrical structure, that when a plurality of supporting members are provided in the thin cylindrical structure, the supporting members with different inside diameters are used. The supporting members are provided in the order of inside diameter first from the largest. Further in this case, it is the eighth aspect that the central axis of the supporting members coincides approximately with the central axis of the thin cylinder, then the thin cylinder is plastically deformed to reduce the inside diameter of the thin cylinder.

It is the ninth aspect, in the method for manufacturing the cylindrical structure, that when a plurality of supporting members are provided in a thin cylindrical structure, the central axis of the plurality of supporting members is forcibly inserted in the thin cylinder in the condition that the center axis of the plurality of supporting members is not in parallel with the axis of the thin cylinder. The supporting members are located at the prescribed positions in the thin cylindrical structure, and then the central axis of the plurality of supporting members and the central axis of the thin cylinder are coincided.

It is the tenth aspect, in the method for manufacturing the cylindrical structure, that the plurality of supporting members is deformed in the circumferential direction and then provided in the thin cylinder. It is the eleventh aspect that the cross-sectional shape of the inside diameter in the axial direction of the thin cylindrical structure is formed in an inversed crown shape.

It is the twelfth aspect that the fixing device is provided with a thin cylindrical structure having a structure which prevents loss of contact between the inner reinforcing members and the thin cylindrical structure and prevents collapsing in the circumferential direction of the thin cylindrical structure due to wall-thinning, wherein the thermal expansion coefficient of the supporting member provided in the fixing roller is equal to or larger than the thermal expansion coefficient of the thin cylinder. It is the thirteenth aspect that the ends of the fixing roller are plastically deformed.

It is the fourteenth aspect that the fixing roller which is subjected to outside diameter working after the supporting member is provided is used. It is fifteenth aspect of the thin cylindrical structure that the plurality of supporting members is provided in the thin cylinder and then the thin cylinder is worked on the outside diameter to a prescribed wall thickness. It is sixteenth aspect of the fixing device of the present invention that the fixing device is added with a mechanism for compensation of elastic deformation of the fixing roller in the axial direction.

BRIEF DESCRIPTION OF THE DRAWINGS

FIGS. 23A and 23B are diagrams for illustrating the ring-shaped supporting member used in the experimental example;

FIG. 24 is a diagram for illustrating an example of the supporting member with a modified shape used in the experimental example;

DETAILED DESCRIPTION OF PREFERRED EMBODIMENTS

Figure 1:
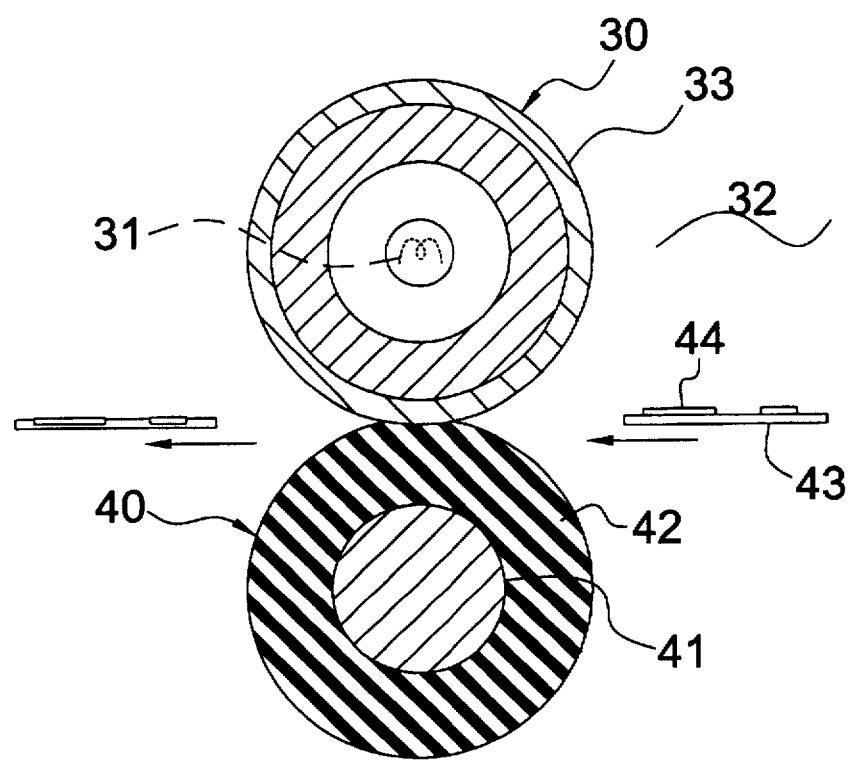
FIG. 1 is a diagram for illustrating the schematic structure of a fixing device according to the heat fixing.
Figure 2:
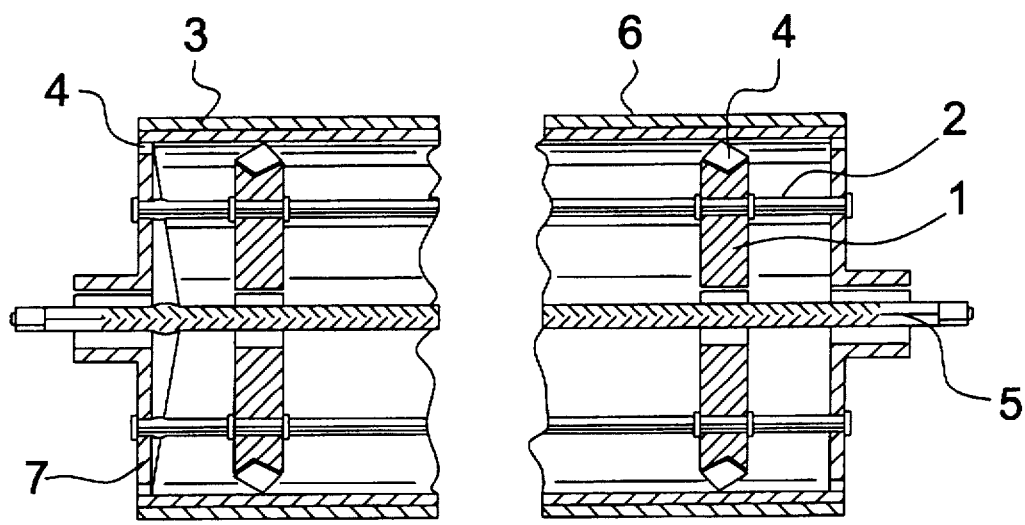
FIG. 2 is a cross-sectional view for illustrating the first example of a conventional fixing roller structure.
Figure 3:
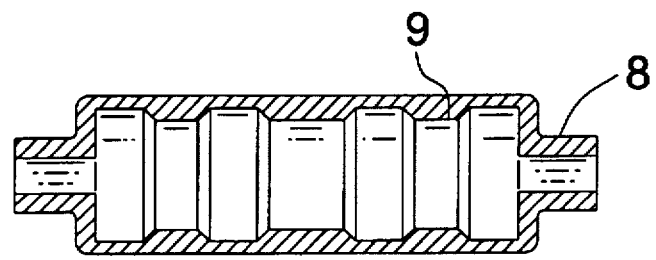
FIG. 3 is a cross-sectional view for illustrating the second example of a conventional fixing roller structure.
Figure 4:
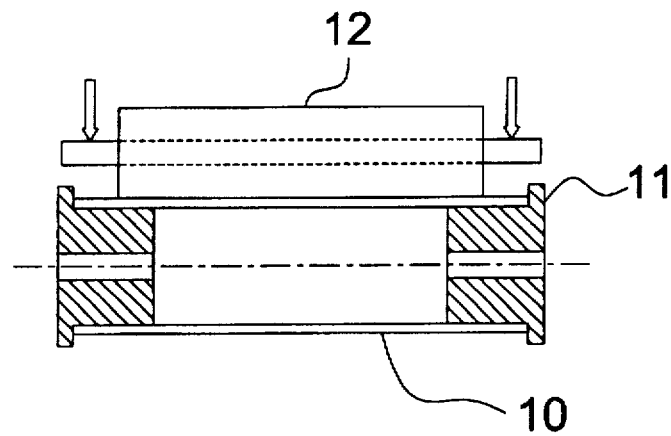
FIG. 4 is a cross-sectional view for illustrating the third example of a conventional fixing roller structure.
Figure 5:
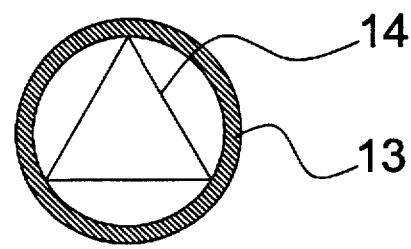
FIG. 5 is a cross-sectional view for illustrating the fourth example of a conventional fixing roller structure.
Figure 6:
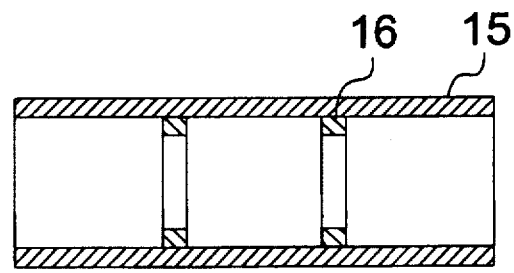
FIG. 6 is the first diagram for illustrating the basic structure of a thin cylindrical structure used for the fixing device of the present invention.
Figure 7:
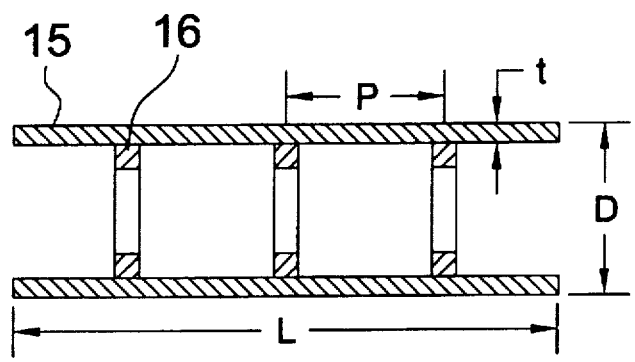
FIG. 7 is the second diagram for illustrating the basic structure of a thin cylindrical structure used for the fixing device of the present invention.

Embodiments of the present invention will be described in detail referring to the drawings hereinafter. FIG. 6 and FIG. 7 are cross-sectional views for illustrating the basic structure of a thin cylindrical structure used for a fixing device of the present invention. In each of FIGS. 6 and 7, the numeral 15 represents the thin cylindrical structure, and the numeral 16 represents a supporting member. In detail, The basic structure of the thin cylindrical structure used for the fixing device in accordance with the present invention has a structure in which the supporting member 16 is forcibly inserted inside the thin cylindrical structure 15 in contact with it, thereby some portions of the peripheral surface of the thin cylindrical structure are kept in contact with the inside surface of the thin cylindrical structure as shown in FIG. 6. At least one or more of supporting member 16 are provided in the thin cylindrical structure. As shown in the figure, the supporting member 16 is kept in forcibly inserted condition, thereby the reduction of rigidity in peripheral direction due to the thinning of the wall of the cylinder is significantly improved.

For providing the supporting member 16 in the thin cylindrical structure to increase efficiently the rigidity, a plurality of supporting members are provided, and the interval between supporting members 16 is prescribed in a specified range where the collapsing prevention is remarkably effective as shown in FIG. 7. Such condition is specified in detail by the following equations, $$L>200 \text{ mm}, t/D<0.02, P<150 \text{ mm}$$

wherein P represents the interval between supporting members 16, L the length of the thin cylindrical structure, D the outside diameter of the cylindrical structure, and t the wall thickness of the thin cylindrical structure.

Figure 8:
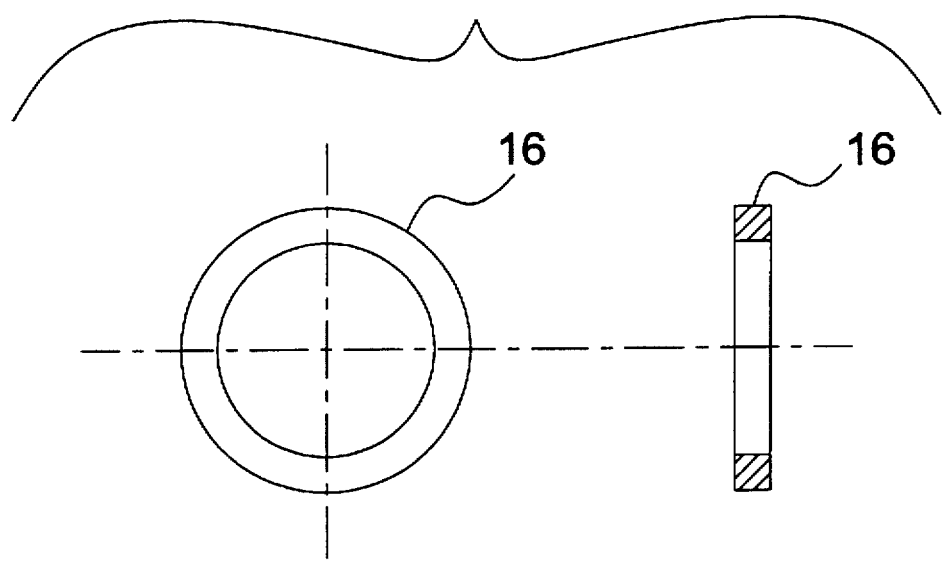
FIG. 8 is a diagram for illustrating the first shape example of a supporting member.
Figure 9:
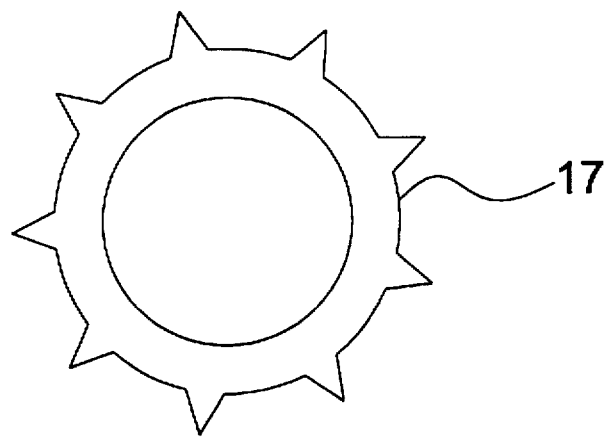
FIG. 9 is a diagram for illustrating the second shape example of a supporting member.
Figure 10:
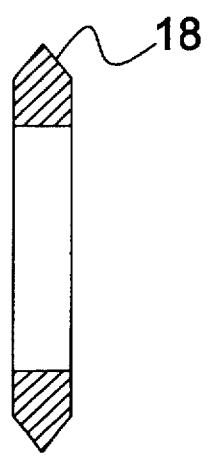
FIG. 10 is a diagram for illustrating the third shape example of a supporting member.

Next, the shape of the supporting member 16 to be provided inside the thin cylindrical structure in the forced condition is described. FIG. 8 is a diagram for illustrating the first example of the shape of a supporting member, FIG. 9 is a diagram for illustrating the second example of the shape of a supporting member. Further, FIG. 10 is a diagram for illustrating the third example shape of a supporting member.

To improve the rigidity of the thin cylindrical structure, the shape of a supporting member 16 to be provided in the inside in the forced condition is prescribed to be a shape of a narrow cylinder as a whole (ring like shape), for example, as shown in FIG. 8. To prevent loss of contact between the supporting member and the inside of the thin cylindrical structure due to deformation of the thin cylindrical structure, the irregular shape of the outside peripheral surface of a supporting member is preferable instead of the regular smooth cylindrical shape of the outside peripheral surface of a supporting member as described hereinunder. The cross-sectional shape of the outside peripheral surface in the axial direction of a supporting member has notches or projections at least on a portion so that the projected portion is forced to bite into the portion of the inside surface of the thin cylindrical structure when the supporting member is forcibly inserted.

In detail as shown in FIG. 9, the supporting member 17 with modified shape has the cross-sectional shape of the outside peripheral surface in the axial direction provided with notches or projections at least on a portion. In other words, the cross-sectional shape of the outside peripheral surface in the axial direction has a shape which is not circular. The cross-sectional shape in the radial direction is also modified in the same manner as that for in the axial direction. In detail as shown in FIG. 10, the supporting member 18 with modified shape in different way has the cross-sectional shape of the outside peripheral surface in the radial direction provided with notches or projections on a portion. The cross-sectional shape of the outside peripheral surface in the radial direction is formed in a shape which is not linear. By providing the outside peripheral surface of the supporting member with notches or projections at least on a portion, the contact strength between the inside peripheral surface of the cylindrical structure and the outside peripheral surface of the supporting member is significantly improved when the supporting member is forcibly inserted and the loss of contact between the supporting member and the inside peripheral surface of the supporting member is prevented.

Figure 11:
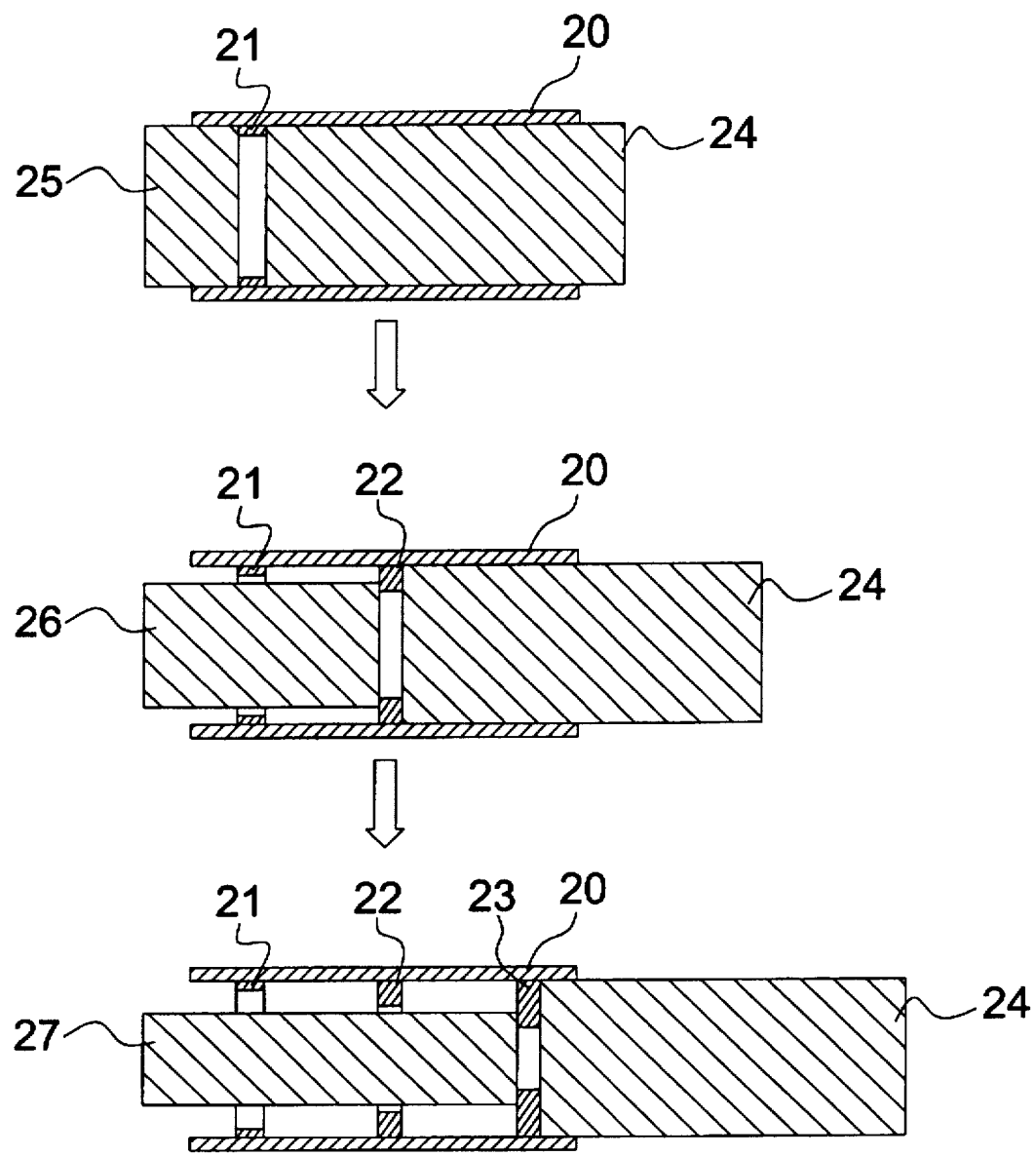
FIG. 11 is a diagram for illustrating the first example of the method for manufacturing the cylindrical structure in accordance with the present invention.

Next, a manufacturing process of cylindrical structures to be forcibly inserted to a thin cylindrical structure in which the supporting member is maintained firmly is described. FIG. 11 is a diagram for illustrating the first example of manufacturing process of a cylindrical structure in accordance with the present invention. When a plurality of supporting members are forcibly inserted in a thin cylindrical structure, for example, when three or more of supporting members are forcibly inserted in a thin cylindrical structure, as shown in FIG. 11, the inside diameter of the plurality of supporting members 21 to 23 to be forcibly inserted in the thin cylindrical structure 20 is formed differently in individual supporting members. That is, the inside diameter of a supporting member which is forcibly inserted first is largest, second is intermediate, and third is smallest. Thus, supporting tools 25 to 27 can support the supporting members 21 to 23 respectively without interference between the supporting members 21 to 23 already inserted and supporting tools 25 to 27. The plurality of supporting members 21 to 23 can thus be forcibly inserted successively using a pressing tool 24.

Figure 12:
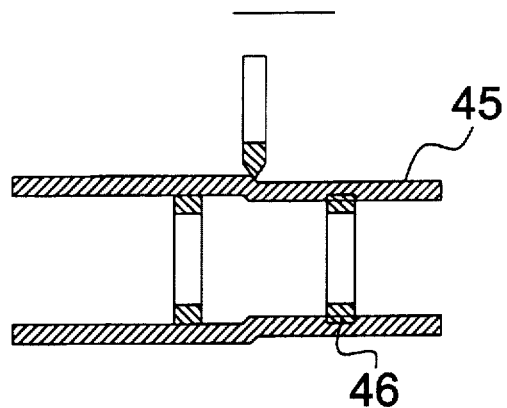
FIG. 12 is a diagram for illustrating the second example of the method for manufacturing the thin cylindrical structure in accordance with the present invention.

FIG. 12 is a diagram for illustrating the second example of the manufacturing process of the thin cylindrical structure in accordance with the present invention. To ensure the contact at partial areas on the outside peripheral surface of the supporting member on the inside surface of the thin cylindrical structure, in this manufacturing process of the thin cylindrical structure shown in FIG. 12, when the thin cylindrical structure provided with a plurality of supporting members is manufactured, a supporting member 46 is provided (forcibly inserted) at a prescribed position with coinciding its axis coaxially with the axis of the cylindrical structure 45. Then the cylindrical structure is plastically worked so that the outside diameter of the cylindrical structure 45 is reduced. The supporting member is thereby fixed to the cylindrical structure 45 in the firm contact condition.

Figure 13:
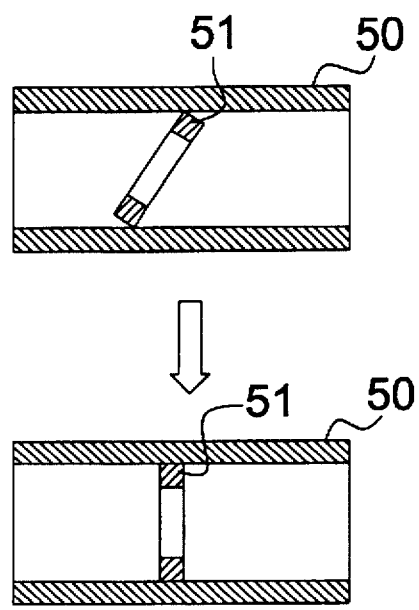
FIG. 13 is a diagram for illustrating the third example of the method for manufacturing the thin cylindrical structure in accordance with the present invention.
Figure 14:
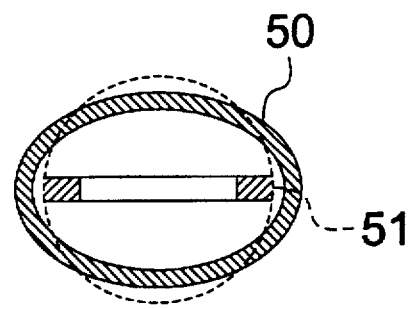
FIG. 14 is a diagram for illustrating the third example of the method for manufacturing the thin cylindrical structure in accordance with the present invention.

FIG. 13 and FIG. 14 are diagrams for illustrating another examples of the manufacturing process of the thin cylindrical structure in accordance with the present invention. It should be ensured that the firm contact of partial areas of the outside peripheral surface of a supporting member with the inside surface of the thin cylindrical structure when the supporting member is forcibly inserted in the thin cylindrical structure. To achieve this, in this manufacturing process shown in FIG. 13, a supporting member 51 is provided at a prescribed position with arrangement of the axis of the supporting member 51 being not parallel with the axis of the thin cylindrical structure 50 when the supporting member 51 is forcibly inserted to set it in the thin cylindrical structure 50. Then, the inclination of the supporting member 51 is changed so that the axis of the supporting member 51 coincides with the axis of the thin cylindrical structure 50 coaxially, thereby the contact area between the outside peripheral surface of the supporting member 51 and the inside surface of the thin cylindrical structure 50 is increased, thus the supporting member 51 is forcibly inserted in firm contact condition.

When the supporting member is provided in the cylindrical structure, that is, in the initial process shown in the upper half of FIG. 13, at least any one of the cylindrical structure 50 and supporting member 51 is deformed in the peripheral direction as shown in FIG. 14, then the supporting member 51 is placed at the prescribed position inside the cylindrical structure 50. By placing the supporting member in deformed condition, the operating efficiency is significantly improved. In detail, during this process, if the cylindrical structure 50 and supporting member 51 are projected obliquely from the axial direction of the cylindrical structure 50, the maximum inside diameter of the cylindrical structure 50 is different significantly from the minimum outside diameter of the supporting member 51, therefore the supporting member 51 is placed very easily in the cylindrical structure 51 in the earlier half process.

Figure 15:
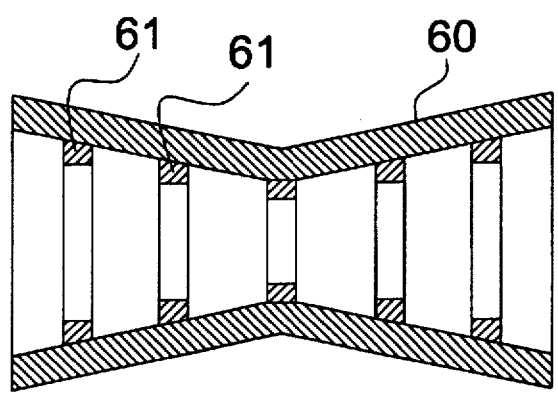
FIG. 15 is a diagram for illustrating the fourth example of the method for manufacturing the thin cylindrical structure in accordance with the present invention.

For more easy placing of a supporting member in a cylindrical structure, a cylindrical structure having an inside diameter in the axial direction in the form of an inverse crown may be used. FIG. 15 is a diagram for illustrating the fourth example of the manufacturing process of the thin cylindrical structure in accordance with the present invention. As shown in FIG. 15, a cylindrical structure 60 having the inside diameter in the form of an inverse crown in the axial direction is used. By using the cylindrical structure 60 having such shape, a plurality of supporting members 61 are forcibly inserted in the cylindrical structure 60 successively from one side. Thus, the allowance between the inside diameter of the cylindrical structure 60 and supporting members 61 is designed easily. In FIG. 15, for easy understanding of the difference in shape between the previous cylindrical structures and this cylindrical structure 60, the diameters at the ends and middle are different exaggeratedly. Actually as shown in the embodiment (FIG. 29) described hereinafter, for a cylinder with a length of 400 mm, the diameter at the ends is 35.4 mm and the diameter at the middle is 35.0 mm.

A cylindrical structure provided with the reinforcing members capable of preventing effectively the collapsing in the peripheral direction due to the wall thinning is used for a fixing device, thereby the warm-up time is shortened significantly and the applicable load is increased significantly without using a large-sized structure of the fixing device. Thus, a fixing device having excellent fixing performance is structured.

For a fixing device, usually a fixing roller of a cylindrical structure is heated at the time of usage, therefore during the heating, the supporting member can lose contact with the cylindrical structure because of the difference in thermal expansion coefficient of the material used for the cylindrical structure of the fixing roller and the supporting member, for instance, if the thermal expansion coefficient of the supporting member is smaller than that of the cylinder.

Though such loss of contact hardly happens because the supporting member is forcibly inserted in the thin cylinder, such loss of contact is prevented more reliably by selecting materials such that the thermal expansion coefficient of the material used for the supporting member is larger than that of the material used for the fixing roller. In detail, in such case that the thermal expansion coefficient of the supporting member is larger than that of the fixing roller, the thermal expansion of the supporting member is larger to cause increased thermal stress at the contact portions. The increased thermal stress results in strong bonding between the fixing roller and supporting member, thus the concern of loss of contact is dissipated.

Figure 16A:
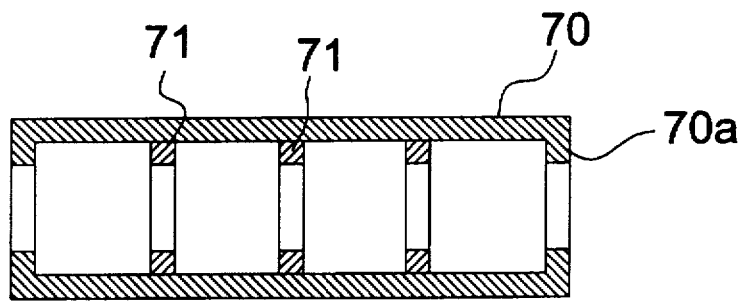
FIGS. 16A and 16B are diagrams for illustrating the fifth example of the method for manufacturing the thin cylindrical structure in accordance with the present invention.
Figure 16B:
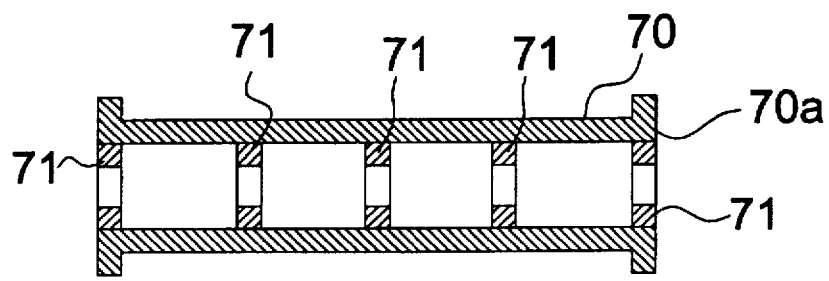
Figure 17:
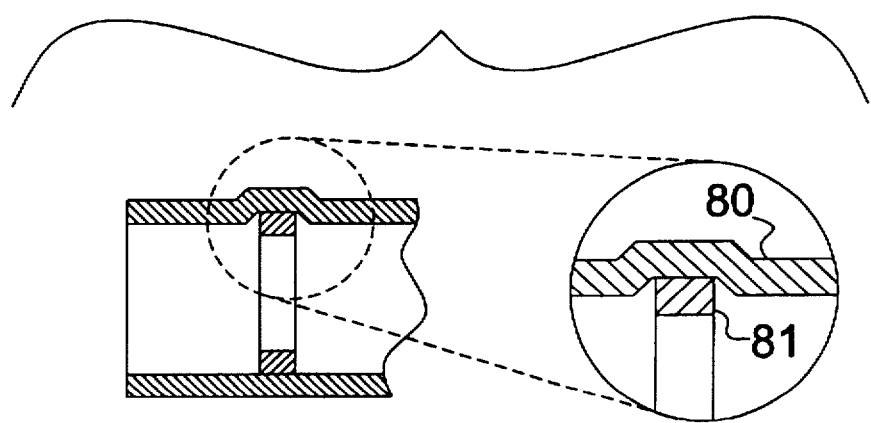
FIG. 17 is a diagram for illustrating the transition in which the existence of the supporting member is revealed on the peripheral surface of the cylindrical structure.
Figure 18:
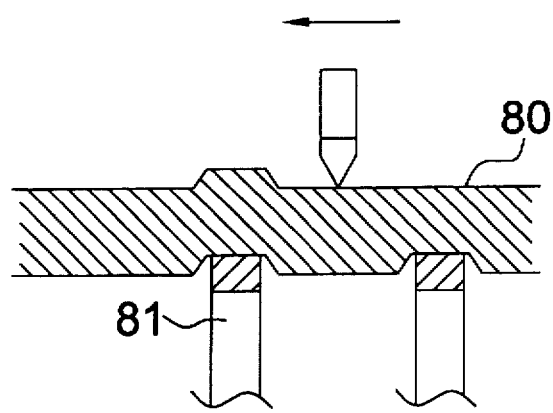
FIG. 18 is the first diagram for illustrating the process of the outside diameter working on the thin cylindrical structure up to a prescribed wall thickness after the supporting member is provided in the thin cylindrical structure.

When a plurality of supporting members are provided in a thin cylindrical structure, the supporting member to be provided at the end of the cylindrical structure can be eliminated by bending the end of the thin cylindrical structure. In detail as shown in FIG. 16A, supporting members 71 to be provided inside the thin cylindrical structure 70 are forcibly inserted first in the thin cylindrical structure 70, that is, the supporting members 71 are provided in the condition that portions of the peripheral surface of the supporting members 71 are brought into forced contact with the inside surface of the cylindrical structure 70. Thereafter the ends 70a of the thin cylindrical structure 70 are plastically deformed and bent inward to the center, which end is easy to work, without providing supporting members to be provided at the both ends, instead of providing the end supporting members. The improvement of manufacturing efficiency and cost saving are accomplished without loosing collapsing preventing function. Alternatively, as shown in FIG. 16B, the ends 70b of thin cylinder 70 can be plastically deformed and bent away from the center of thin cylindrical structure 70 to provide additional reinforcement, with supporting members 71 being pressed into cylinder 70 including at the ends of cylinder 70.

For manufacturing a cylindrical structure in accordance with the fixing device of the present invention, a supporting member is provided in a thin cylindrical structure in the forced contact condition by forcibly inserting the supporting member. Because of the forced insertion, in the case that the extent of thinning is serious (in the case that extremely thin wall is used), the existence of the supporting member 81 can be revealed on the outside peripheral surface of the cylindrical structure 80. If such cylindrical structure is used as a fixing roller, the uneven shape on the outside peripheral surface of the fixing roller causes poor image quality. For using such cylindrical structure, after the supporting members 81 are provided in the thin cylindrical structure 80, the outside diameter of the thin cylindrical structure is cutting-worked to a prescribed wall thickness to eliminate the unevenness of the peripheral surface of the fixing roller when the thin cylindrical structure 80 is used as a fixing roller. When the thin cylindrical structure in which the supporting member is forcibly inserted is used as a fixing roller, the fixing roller can be used as a fixing roller having excellent outside peripheral surface.

Figure 19:
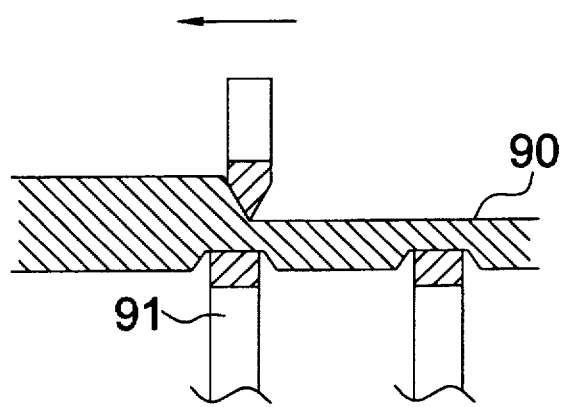
FIG. 19 is a diagram for illustrating the process of the outside diameter working for additional thinning of the wall after the supporting member is provided in the cylindrical structure.

The thinning work of wall thickness of a cylindrical structure is difficult working itself. The difficult working is attributed primarily to collapsing of the cylindrical structure during working, however as for the structure of cylindrical structure of the present invention, the resistance to collapsing is improved by providing the supporting member. Therefore in the manufacturing process of the thin cylindrical structure of the present invention as shown in FIG. 19, first the supporting members 91 are forcibly inserted in the cylindrical structure 90 having a given wall thickness to provide the supporting members 91, then the outside diameter of the fixing roller may be cutting-worked to a prescribed wall thickness. A thinner cylindrical structure is obtained in comparison with a thinned wall formed by thinning of a cylindrical structure in the previous process (in the case of no supporting member).

Though collapsing of a fixing roller is significantly prevented by the effect of supporting members provided in a thin cylindrical structure, simultaneously a fixing roller is deflection-deformed in the axial direction. Then, to prevent the deflection, the fixing roller is added with the conventionally known mechanism for compensation of elastic deformation in the axial direction when the fixing roller is used for a fixing device, thus the fixing roller can be used at the limit of strength of a whole fixing roller.

Figure 20:
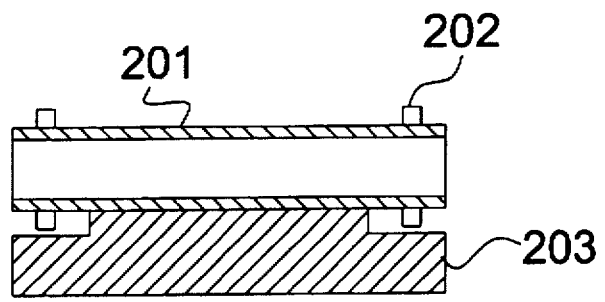
FIG. 20 is a diagram for illustrating the roll load loading device for the fixing roller.

Next, characteristics of the fixing roller which are exhibited when the thin cylindrical structure manufactured as described above is used as the fixing roller of a fixing device are described. FIG. 20 is a diagram for illustrating a roll load loading device for a fixing roller. The thin cylinder roller 201 of the fixing roller is an iron core with a diameter of 35 mm, wall thickness of 0.55 mm, and length of 335 mm. The thin cylinder roller 201 is supported by bearings 202 at both ends. An iron load loading bar 203 functions to load a load on the thin cylinder roller 201 with aid of load loading mechanism (not shown in the figure) without deflection of the iron load loading bar 203 because of sufficient strength. Strain gages are attached to the outside peripheral surface of thin cylinder roller 201, while strains in the axial direction and circumferential direction at various locations are measured when loaded by the cylindrical roller load loading device.

Figure 21A:
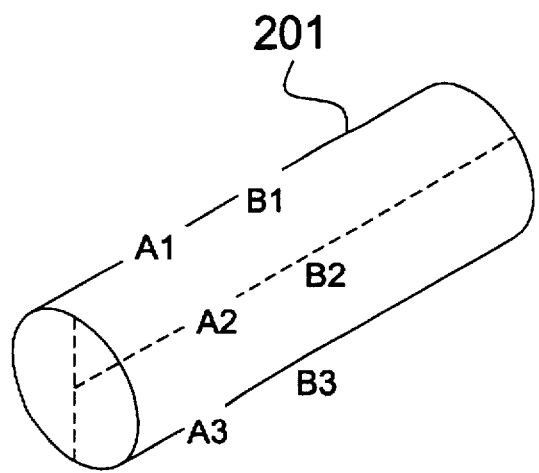
FIGS. 21A and 21B are diagrams for illustrating the positions where strain gages for measurement of the thin cylindrical structure are fixed.
Figure 21B:
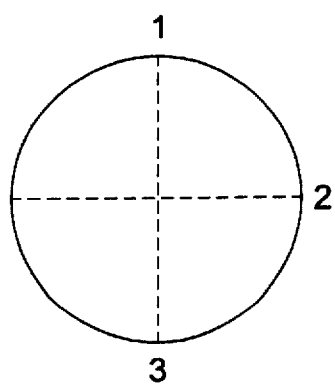
Figure 22A:
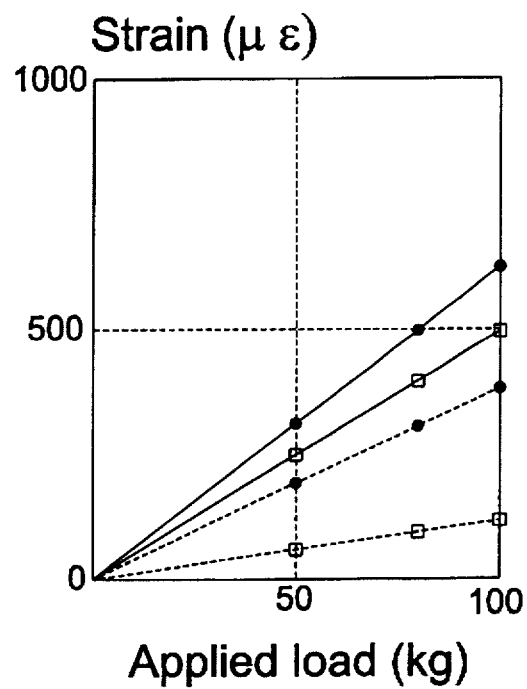
FIGS. 22a–22c are a set of graphs for describing the measurement result measured at the positions shown in FIG. 21.

Measurement points are located at the end (A series) and at the middle (B series), and located along the circumference at the end and the middle, at the top (series with suffix 1), at the midpoint (series with suffix 2), and at the bottom (series with suffix 3) on the outside peripheral surface of the thin cylinder 201. Namely, strain gages (Kyowa Dengyo Co., not shown in the figure) are attached to the positions (A1, A2, A3, B1, B2, and B3) shown in FIGS. 21 (A) and FIG. 21 (B). The fixing load is loaded using the above-mentioned cylindrical roll load loading device, and strains at the positions in the axial direction and circumferential direction are measured. The measurement results are shown in FIGS. 22(A), (B), and (C).

Figure 22B:
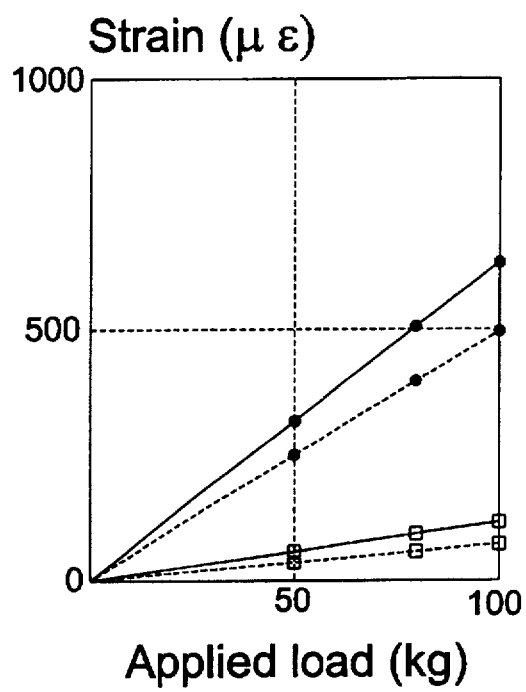
Figure 22C:
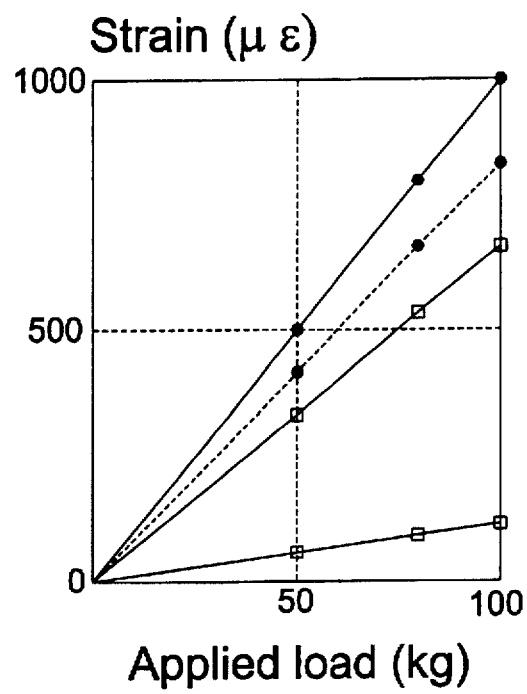

The positions of A-series are located around the end and the positions of B-series are located around the middle. Data of strain are represented by absolute value regardless of the force being compressive or tensile. As obvious from the measurement results shown in FIGS. 22A, 22B and 22C the increasing rate of strain is largest at the middle of the cylindrical roller and the increasing rate of strain in the circumferential direction is largest at the position (B3) which is in contact with the load loading bar. Of course, permanent strain (plastic strain) is caused first at the same position and in the same direction.

A supporting member with a thickness of 0.8 mm and a width of 2.0 mm as shown in FIGS. 23A and 23B is forcibly inserted at the position (B3) where the increasing rate of strain is largest, and strains are measured again. The result shows that strain at the middle in the circumferential direction is reduced to ⅓. The reduction to ⅓ means the increase of pressure resistance by three times. It is not necessary that the inner supporting member is brought into contact entirely with the inside surface of the thin cylindrical roller. In the case that an inner supporting member with a modified cross section as shown in FIG. 24 is used, the inner supporting member causes no problem (no deterioration in collapse preventing function). In view of easy manufacturing and manufacturing cost, the ring-shaped supporting member as shown in FIGS. 23A and 23B is used preferably.

For more improvement of the collapse prevention performance of the thin cylindrical roller, a plurality of supporting members are forcibly inserted and provided in a thin cylindrical roller. When a thin cylindrical roller supported at both ends is loaded increasingly, permanent deformation in circumferential direction occurs prior to permanent deformation in the axial direction. It is preferable that the generation of permanent strain in the circumferential direction and the generation of permanent strain in the axial direction occur under the same loading condition. The generation of permanent strain under the same loading condition means the improvement of load resistance performance.

Figure 25A:
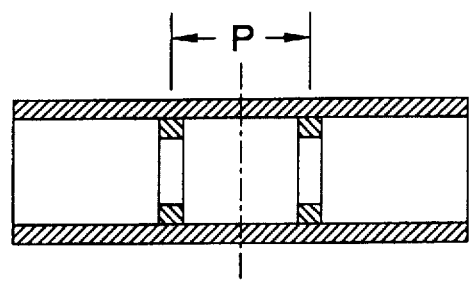
FIGS. 25a–25b depict a diagram and a graph, respectively, illustrating an experimental example for measurement of the extent of deformation when the locations of a plurality of supporting members in the thin cylindrical structure are changed.
Figure 25B:
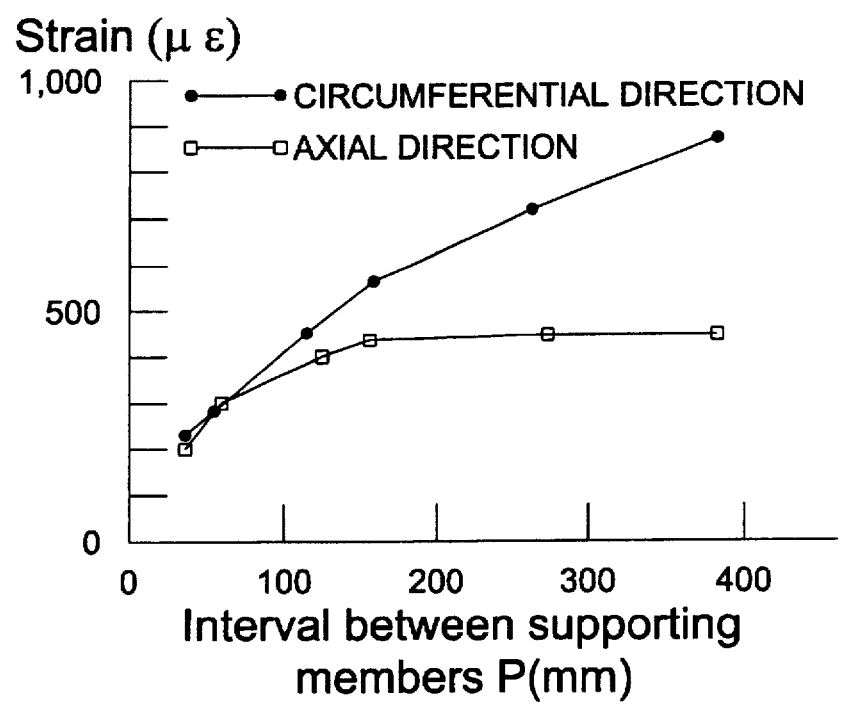

FIGS. 25A and 25B are diagrams for illustrating an experimental example in which the deformation is measured on a thin cylindrical structure provided with a plurality of supporting members wherein the location of supporting members is changed variously. For example, two ring-shaped supporting members as shown in FIGS. 23A and 23B are located at the middle of the thin cylindrical roller as shown in FIG. 25 (A), and strain at the position (B3) at the middle of the thin cylindrical roller is measured in the same manner as used in the above-mentioned example under a constant load of 100 kgf under various distances P between the two supporting members. Referring to the result shown in FIG. 25 (B), strain in the axial direction and strain in circumferential direction at the middle position (B3) are in the almost same level under the distance between supporting members shorter than 150 mm. However, under the distance P between supporting members exceeding 150 mm, strain in the axial direction at the middle position (B3) saturates at a certain level, and the difference between strain in the axial direction and strain in the circumferential direction is enlarged. Therefore when the load is increased, the permanent strain in the circumferential direction occurs first.

This trend is associated with the length of a thin cylindrical roller L, outside diameter D, and wall thickness t. According to the experimental result obtained by the inventors, it is found that the following condition is preferable.

$$L > 200 \text{ mm and } t/D < 0.02$$

When a thin cylindrical roller is reinforced by providing supporting members in the inside, it is very important as described above how supporting members are forcibly inserted in a thin cylindrical roller. In the method for manufacturing a cylindrical structure used for fixing devices of the present invention, particularly two points "(1) prevention of loss of contact between supporting members and the thin cylindrical roller" and "(2) forced insertion of a plurality of supporting members" are important.

First, a structure for preventing loss of contact with supporting members forcibly inserted in a thin cylindrical roller is described. Loss of contact with of supporting members forcibly inserted in a thin cylindrical roller happens mainly when the supporting member receives an external force. The external force is exerted when a certain load (static load) is applied on the structure of a thin cylindrical roller, when a load due to vibration or rotation (dynamic load) is applied, or when a load due to collision of some thing is applied. To prevent loss of contact of supporting members, it is important to increase the contact pressure since the inside peripheral surface of the thin cylindrical roller and the outside peripheral surface of supporting members are maintained in the firm contact condition.

Figure 26:
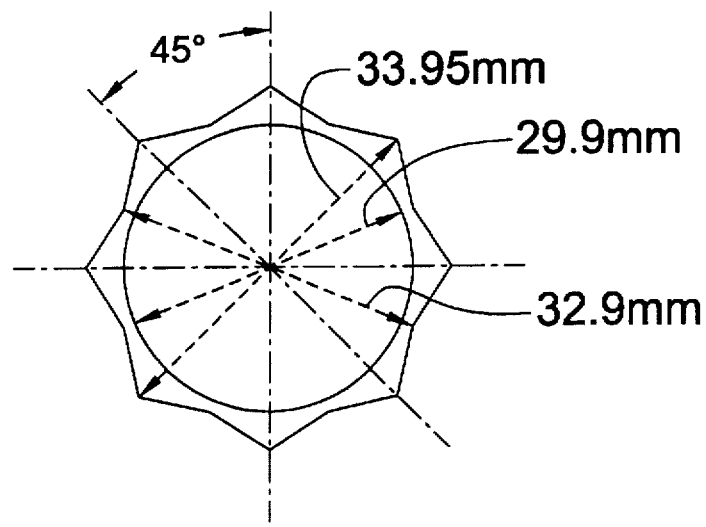
FIG. 26 is a diagram for illustrating the first shape example of the supporting member with a modified shape used in the experimental example.

The contact strength is increased easily merely by modifying the shape of the outside peripheral surface of a supporting member for preventing the loss of contact. For example as shown in FIG. 26, the cross section in the axial direction of the outside peripheral surface of a supporting member is provided with projections. The supporting member with such a shape is forcibly inserted in a thin cylindrical roller. Such a supporting member will not drop off when the external force is exerted on it.

Figure 27:
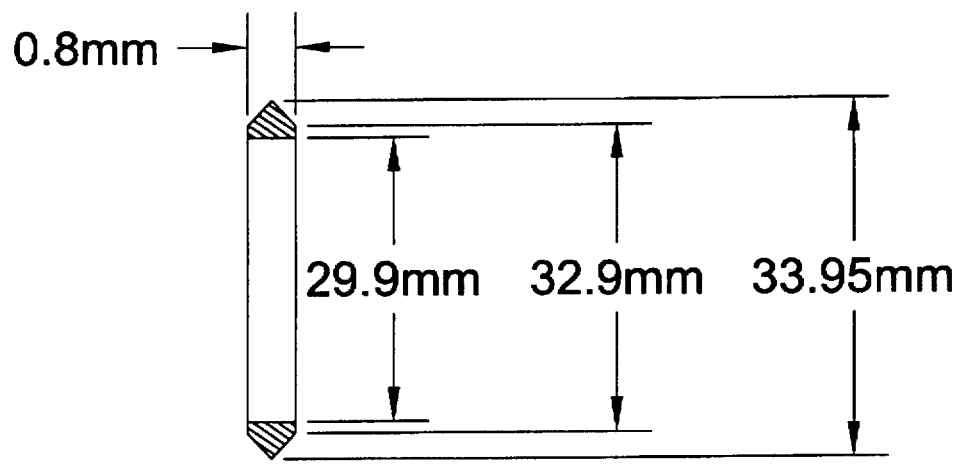
FIG. 27 is a diagram for illustrating the second shape example of the supporting member with a modified shape used in the experimental example.

As shown in FIG. 27, the cross section in the circumferential direction of the outside peripheral surface of a supporting member is provided with a projection. The supporting member with such shape is forcibly inserted in a thin cylindrical roller. Such a supporting member will not lose contact with the thin cylindrical roller when the external force is exerted on it. Two types of examples of outside peripheral surface shape of the supporting member are described, however the shape is not limited to the shape of projection. It is obvious that any other shape may be applied as far as the shape is effective for strengthening the contact strength of the contact of the inside surface of a thin cylindrical roller with the outside peripheral surface of a supporting member.

Figure 28:
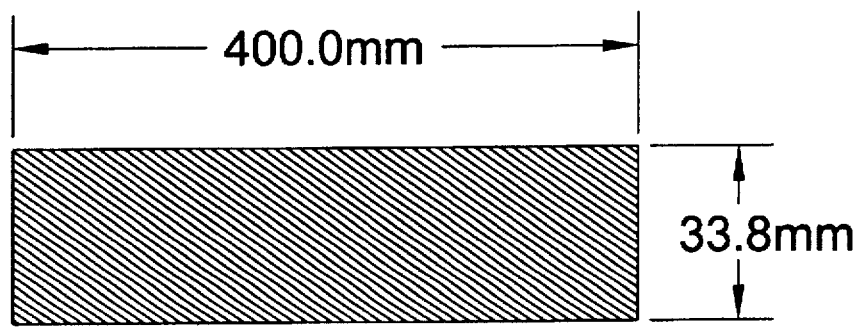
FIG. 28 is a diagram for illustrating the pressure tool used in the experimental example.

When a thin cylindrical roller is reinforced by providing supporting members, it is an important point how a supporting member is forcibly inserted in a thin cylindrical roller as described above. In addition, "insertion of a plurality of supporting members" is also very important point. When only one supporting member is forcibly inserted in a thin cylindrical roller, the supporting member may be pushed from both sides of the thin cylindrical roller using cylinders (may be either solid or hollow) with an outside diameter smaller than the inside diameter of the thin cylindrical roller as shown in FIG. 28 as a supporting tool for the supporting member and a pressing tool for the supporting member. Though, the outside diameter of the supporting member is approximately equal to the inside diameter of the thin cylindrical roller or slightly larger than the inside diameter of the thin cylindrical roller for compression fitting.

As shown in FIG. 13, a supporting member is inserted with inclination (the axis of the supporting member is not in parallel with the axis of the thin cylindrical roller) in a thin cylindrical roller, thereby the friction between the inside surface of the thin cylindrical roller and the outside peripheral surface of the supporting member is reduced. The reduced friction allows the supporting member to be inserted easily. As shown in FIG. 14, at least one of a supporting member or thin cylindrical roller is deformed elastically to form a clearance between the supporting member and the inside surface of the thin cylindrical roller, thus the supporting member is provided easily to the prescribed position. The working efficiency for manufacturing is thus improved. Using a tool having a size shown in FIG. 28, the supporting member as shown in FIG. 23 is inserted easily in a thin cylindrical roller.

When a plurality of supporting members are forcibly inserted in a thin cylindrical roller, there is the problem of interference between a supporting member inserted earlier and a supporting member inserted later, interference between a supporting member inserted earlier and a tool, or interference between a supporting member and the thin cylindrical roller. For example, four ring-shaped supporting members as shown in FIG. 23 are provided in an iron thin cylindrical roller with an inside diameter of 34 mm, outside diameter of 35 mm, and length of 335 mm at prescribed positions. Then the thin cylindrical roller is subjected to swaging work (drawing) for ensuring firm contact as shown in FIG. 12. In this case, no interference problem occurs during the setting work of the plurality of supporting members. Further, for avoiding the interference between the supporting member and tools, three ring-shaped supporting members as shown in FIG. 23 with ring wall thicknesses of 2 mm, 3.5 mm, and 5 mm are forcibly inserted successively in a thin cylindrical roller according the manufacturing method as shown in FIG. 11 using three supporting tools with outside diameters of 33.8 mm, 32.3 mm, and 30.8 mm corresponding to the above-mentioned three supporting members. In this case, no interference problem occurs.

Figure 29:
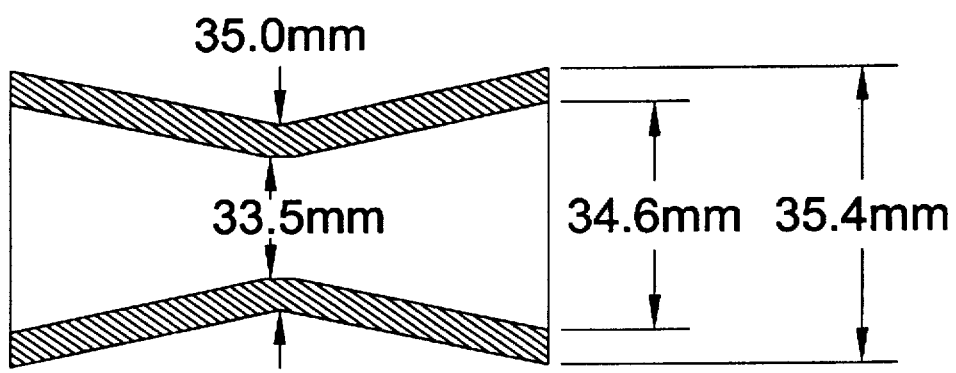
FIG. 29 is a diagram for illustrating an example of thin cylindrical structure with a modified shape used in the experimental example.
Figure 30:
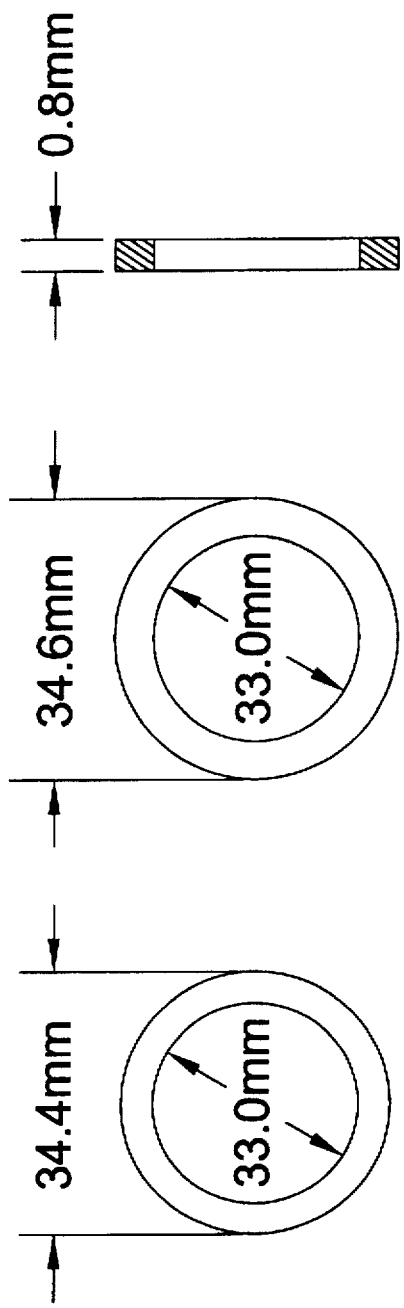
FIGS. 30a–30c are a set of diagrams for illustrating examples of supporting member to be forcibly inserted in the cylindrical structure shown in FIG. 29.

Supporting members with a width of 0.8 mm as shown in FIG. 30 (a) and 30 (b) are forcibly inserted successively from both sides of a thin cylindrical roller respectively in the iron thin cylindrical roller with an even wall thickness of 0.44 mm which is tapered so that the inside diameter is shaped in a form of inverse crown in the axial direction by bulging as shown in FIG. 29. In this case, no interference problem occurs and the supporting members are forcibly inserted to prescribed positions.

Figure 31:
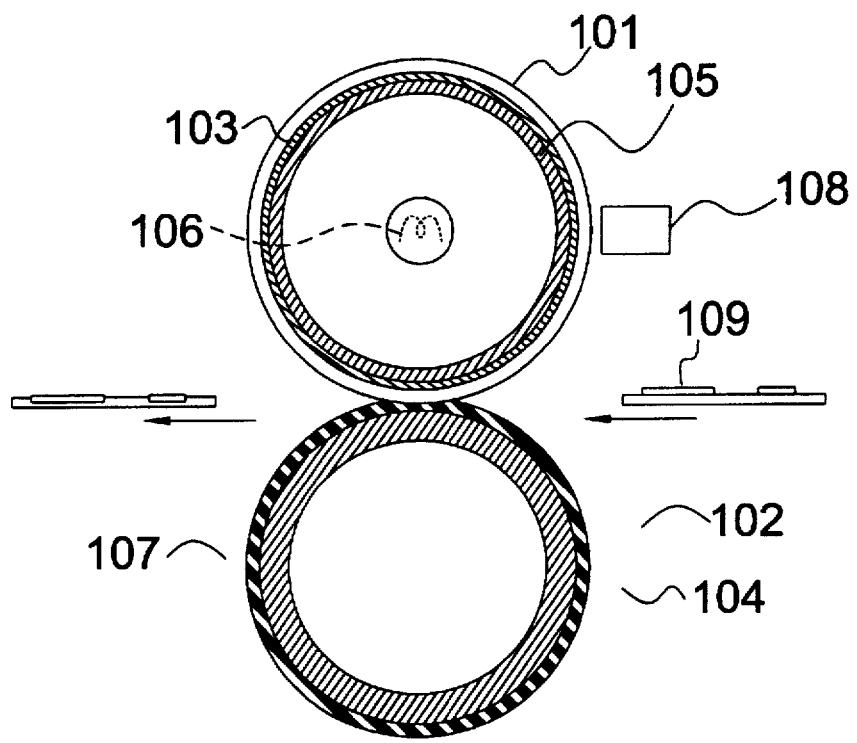
FIG. 31 is a cross-sectional view for illustrating the structure of a fixing device using the thin cylindrical structure of the embodiment of the present invention.

FIG. 31 is a cross-sectional view for illustrating the structure of a fixing device using a thin cylindrical structure according to the embodiments of the present invention. The fixing device shown in FIG. 31 is provided with a fixing roller 101 formed of a thin cylindrical structure having an iron core 103 with a diameter of 40 mm, wall thickness of 0.25 mm, and length of 380 mm coated with a fluororesin (Teflon, brand name of DuPont) with a thickness of 30 µm as a releasing layer. In the fixing roller, supporting members 105 are forcibly located with an interval of 80 mm.

At the center of the fixing roller 101, an infrared ray lamp of 100V, 1000 w is provided as a heating source 106. The infrared ray lamp 106 is controlled by a temperature controller (not shown in the figure) through temperature sensing using a temperature sensor 108 so that the temperature is kept constantly at 150° C. The warm-up time of this fixing roller is as short as 10 seconds because a thin cylinder is used for the fixing roller 101. The fixing roller 101 is driven by a driving motor (not shown in the figure) at a speed of 250 mm/s. A pressure roller 102 is provided with an iron core 104 with an outside diameter of 32 mm, wall thickness of 6 mm, and length of 380 mm coated with a silicone rubber layer 107 with a wall thickness of 4.0 mm. Total load of 50 kg is applied to the pressure roller through bearings on both ends.

Under this condition, the nip area is measured and resultant nips of 6.0 mm at the roller end and 5.4 mm at the roller center are obtained. Based on these values, the nip shape index of 0.9 is obtained. Under this condition, a toner image 109 formed by using a copy machine "Vivace 550" manufactured by Fuji Xerox Co. is fixed. At this time, the image is fixed sufficiently and no cockle on a paper is observed.

As a comparative example, the above-mentioned pressure roller is rotated while being in contact with a conventional fixing roller that is the same fixing roller as used in the above-mentioned example excepting that the supporting members are not provided. At this time, the fixing roller is deformed permanently and collapses by loading of 10 kg, fixing can not be performed.

Usually seamless steel pipes are manufactured by drawing to form the wall thickness of 0.7 mm or thicker. In order to thin the thickness of a cylindrical structure, the outside diameter working is operated using a lathe or centerless grinder. The thinning of wall thickness without deterioration of roundness is restricted because of collapsing of cylindrical structure due to reduced rigidity in the circumferential direction of the cylindrical structure, that is, the rigidity is too low as a workpiece. In the present invention differently from the above-mentioned thinning, collapsing deformation of a cylindrical structure is prevented by forcibly inserting of supporting members in the cylindrical structure.

Experimental detailed values are described. In this experiment, an iron core with an outside diameter of 35.3 mm, inside diameter of 33.9 mm, wall thickness of 0.7 mm, and length of 335 mm is used as a thin cylindrical roller. The roundness of this thin cylindrical roller is 60 μm at the center. Four supporting members with a thickness of 0.8 mm and width of 2 mm shown in FIG. 23 are forcibly inserted in the thin cylindrical roller. The thin cylindrical roller is subjected to in-feed ground using a centerless grinder such that the outside diameter is ground to 34.3 mm. No problem such as cracking on the roller occurs during working, and the thin cylindrical roller is successfully worked. After the grinding, the outside diameter is 34.36 mm and the roundness is 8 μm at the middle, thus the quality of the roller is excellent.

As a comparative example, a thin cylindrical roller is worked without forcible insertion of supporting members in the above-mentioned thin cylindrical roller, after the working, the outside diameter is 35.54 mm and the roundness is 250 μm at the middle, which is no good in quality.

Figure 32:
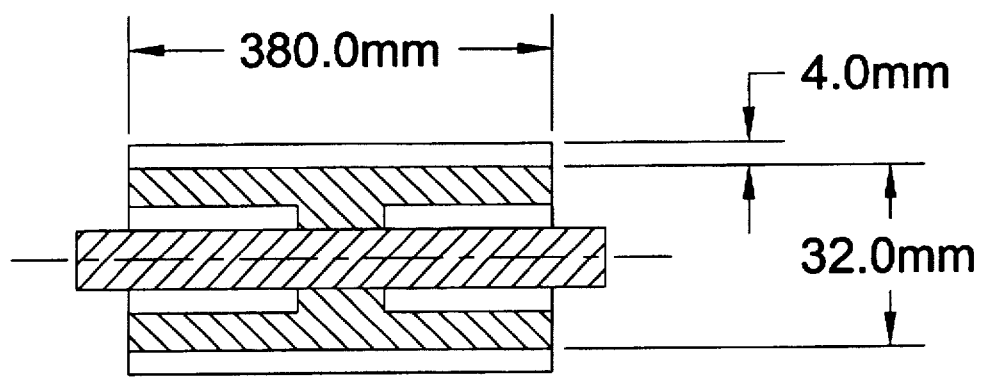
FIG. 32 is a diagram for illustrating an example of deformation of a pressure roller of a fixing device of the embodiment of the present invention.

Further in the fixing device shown in FIG. 31, the pressure roller is replaced with a pressure roller supported at the center. The fixing roller has the same dimensions as used in the example described above excepting that the diameter is 30 mm. Supporting members with an outside diameter of 39.95 mm, width of 0.8 mm, and thickness of 3 mm are forcibly inserted in the thin fixing roller with a interval of 80 mm. The total load of 80 kg is applied through bearings on both ends. In this condition, the deflection of the fixing roller is as large as 0.05 mm at the center, but the deflection is compensated by applying the pressure roller shown in FIG. 32. Then the nip is measured to obtain resultant nip of 7.0 mm at the roller end, and nip of 6.4 mm at the roller middle, this fact suggests that the nip shape index of 0.9 is obtained by structuring a fixing device as described herein above. Further, the collapsing of the fixing roller in the circumferential direction is not observed. When a toner image 9 formed by using "Vivace 550" manufactured by Fuji Xerox Co., ltd. is fixed in such condition. The image is fixed sufficiently and no cockle on a paper is observed.

As described above, according to the cylindrical structure used in the fixing device of the present invention, the collapsing strength limit of a thin cylindrical structure which receives the external force on the peripheral surface is improved significantly. The thin cylindrical structure is manufactured easily, therefore the thin cylindrical structure is worth using. The warm-up time is shortened significantly because a thin cylindrical structure is used as the fixing roller of a fixing device and the heat loss due to supporting members is little. The thin cylindrical structure contributes significantly to the high speed fixing by using the fixing device with the thin cylindrical structure because the collapsing strength limit is improved significantly and high load is loaded between the fixing roller and pressure rollers. Adaption of the thin cylindrical structure to a fixing device has little impact on the bulkiness, weight, and cost of the thin cylindrical structure.

What is claimed is:

1. An image fixing device for heating and pressing recording medium carrying toner images to melt and set the image on the recording medium comprising:

a heating fixing roller for heating said recording medium, rotation driving means for driving rotationally the heating fixing roller, and a pressure body provided on the opposite side of said heating fixing roller with respect to said recording medium, said heating fixing roller comprising:

a thin cylinder; and supporting members in the form of independent, unconnected rings being in contact with the inside surface of said cylinder for supporting said cylinder by deforming the inside surface of said cylinder in the circumferential direction and a central, axial passage through said thin cylinder being defined by inner diameters of said rings.

2. An image fixing device according to claim 1, wherein the cross section in the axial direction of said supporting member has a notch at least on one portion of the outside peripheral surface of said supporting member.

3. An image fixing device according to claim 1, wherein the shape of the outside peripheral surface of the cross section in the axial direction of said supporting member is formed in shape of projection.

4. An image fixing device according to claim 1, wherein the inside diameter of said thin cylinder is formed in an inversed crown shape, and said supporting member comprises a plurality of supporting members with different outside diameters.

5. An image fixing device according to claim 1, wherein the thermal expansion coefficient of said supporting member is approximately equal to the thermal expansion coefficient of said thin cylinder.

6. An image fixing device according to claim 1, wherein the thermal expansion coefficient of said supporting member is larger than the thermal expansion coefficient of said thin cylinder.

7. An image fixing device according to claim 1, wherein the ends of said thin cylinder are bent toward the center of said cylinder.

8. An image fixing device according to claim 1, wherein the ends of said thin cylinder are bent away from the center of said cylinder.

9. A reinforced thin cylindrical structure comprising: a thin cylinder and a supporting member in the form of a ring being in contact with the inside surface of the thin cylinder for supporting said thin cylinder by deforming the inside surface of said cylinder in the circumferential direction and a central, axial bore through said thin cylinder being defined by an inner diameter of said ring.

10. A reinforced thin cylindrical structure according to claim 9, wherein the cross section in the axial direction of said supporting member has a notch at least on one portion of the outside peripheral surface of said supporting member.

11. A reinforced thin cylindrical structure according to claim 9, wherein the shape of the outside peripheral surface of the cross section in the axial direction of said supporting member is formed in shape of projection.

12. A reinforced thin cylindrical structure according to claim 9, wherein the inside diameter of said thin cylinder is formed in an inversed crown shape, and said supporting member comprises a plurality of supporting members with different outside diameters.

13. A manufacturing method for a reinforced thin cylindrical structure in which a plurality of supporting members are forcibly inserted in a thin cylinder, wherein the plurality of supporting members has different inside diameters and said supporting members are forcibly inserted in the order of inside diameter first from the largest.

14. A manufacturing method for a reinforced thin cylindrical structure in which a plurality of supporting members in the form of independent, unconnected rings are provided in a thin cylinder, and in which a central axial bore through said thin cylinder is defined by an inner diameter of said rings, comprising the steps of:

pressing the plurality of independent, unconnected supporting members in the form of rings successively into the thin cylinder such that the central axes of said supporting members coincide approximately with the central axis of said thin cylinder; and plastically deforming said thin cylinder to reduce the inside diameter of said thin cylinder.

15. A manufacturing method for a reinforced thin cylindrical structure in which a plurality of independent, unconnected supporting members in the form of rings are provided in a thin cylinder, comprising the steps of:

pressing said plurality of supporting members in said thin cylinder in the condition that a central axis of each of said plurality of supporting members is not in parallel with the axis of said thin cylinder;

making the central axis of each of said plurality of supporting members and the central axis of said thin cylinder coincide with each other.

16. A manufacturing method for a reinforced thin cylindrical structure in which a plurality of independent, unconnected supporting members in the form of rings are pressed in a thin cylinder, and in which a central axial bore through said thin cylinder is defined by an inner diameter of said rings, wherein said plurality of supporting members are each deformed in the circumferential direction and then pressed in said thin cylinder.

17. A manufacturing method for a reinforced thin cylindrical structure in which a plurality of independent, unconnected supporting members in the form of rings are provided in a thin cylinder, and in which a central axial bore through said thin cylinder is defined by an inner diameter of said rings, wherein the inside peripheral surface of said thin cylinder is deformed in the circumferential direction and then said plurality of supporting members are provided in said thin cylinder.

* * * * *